United States Patent
Cato et al.

(10) Patent No.: US 7,669,476 B2
(45) Date of Patent: *Mar. 2, 2010

(54) SENSING A PAPER ROLL ULTRASONICALLY

(75) Inventors: Robert T. Cato, Raleigh, NC (US); Timothy W. Crockett, Raleigh, NC (US); Richard H. Harris, Raleigh, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/193,787

(22) Filed: Aug. 19, 2008

(65) Prior Publication Data

US 2008/0295598 A1   Dec. 4, 2008

Related U.S. Application Data

(63) Continuation of application No. 11/534,056, filed on Sep. 21, 2006, now Pat. No. 7,464,594.

(51) Int. Cl.
*G01N 3/32* (2006.01)

(52) U.S. Cl. .............................. 73/584; 73/597; 73/602

(58) Field of Classification Search .................. 73/584, 73/597, 602, 599, 600, 620, 622, 625, 628
See application file for complete search history.

(56) References Cited

U.S. PATENT DOCUMENTS 4,398,421 A    8/1983   White
4,422,402 A   12/1983   Ogihara
4,620,184 A * 10/1986   Nedstedt ..................... 340/675
4,882,568 A * 11/1989   Kyser et al. ................. 340/675
4,918,989 A    4/1990   Desruelles et al.
4,947,472 A *  8/1990   Maeda ........................ 355/72
5,048,353 A    9/1991   Justus
5,113,697 A    5/1992   Schlawne
5,713,678 A    2/1998   Smith et al.
5,780,744 A    7/1998   Hall et al.
5,938,354 A    8/1999   Yasui et al.
6,100,993 A    8/2000   Eom et al.
6,341,525 B1   1/2002   Takada et al.
7,240,554 B2   7/2007   Berke
7,549,814 B1 * 6/2009   Arrington et al. ........... 400/613
2008/0038033 A1  2/2008   Do et al.

* cited by examiner

*Primary Examiner*—J M Saint Surin
(74) *Attorney, Agent, or Firm*—Cantor Colburn LLP; Mark McBurney

(57) ABSTRACT

A system for sensing paper on a paper roll includes an ultrasonic transducer positioned to be in contact with an outer surface of the paper roll; a transmitter circuit in communication with the ultrasonic transducer, the transmitter circuit providing a transmit signal to the ultrasonic transducer, the ultrasonic transducer generating an ultrasonic signal in response to the transmit signal; a receiver circuit in communication with the ultrasonic transducer, the receiver circuit providing a received signal indicative of an ultrasonic return echo from the paper roll, the ultrasonic return echo resulting from the ultrasonic signal interacting with the paper roll; and a processor circuit, in communication with the transmitter circuit and the receiver circuit, that determines an amount of paper remaining on the paper roll in response to the transmit signal and the receive signal, the processor providing an output signal when the amount of paper remaining falls below a threshold.

6 Claims, 2 Drawing Sheets

SENSING A PAPER ROLL ULTRASONICALLY

CROSS-REFERENCE TO RELATED APPLICATION

This application is a continuation of U.S. patent application Ser. No. 11/534,056, filed Sep. 21, 2006, the disclosure of which is incorporated by reference herein in its entirety.

BACKGROUND

This invention relates to a system and method for sensing a paper roll, and particularly to a system and method for ultrasonically sensing an amount of paper remaining on a paper roll.

Receipt printer paper, such as are commonly found with point of sale devices, usually comes in rolls. Before our invention, it has been difficult to for a printer to estimate the amount of paper remaining on a roll. This is in part due to the various roll sizes and varied diameters of the hollow center carriers on which the rolls are mounted. In other words, even if two rolls have the same overall outside diameter, one may have a hollow center carrier with a greater outer diameter, thereby resulting in less paper on that roll.

Currently, the last few feet of the paper on a roll are marked with colored ink. When the operator of the point of sale device notices the colored ink on the paper receipts being dispensed, they know to replace the paper roll, as it will soon run out. This tends to work satisfactorily for point of sale devices that are operated by a staff person of an establishment. However, for self-service devices that dispense receipts, the user (when seeing the colored ink on their receipt) does not reliably notify (if at all) a staff person that the paper roll needs to be replaced.

SUMMARY

In an exemplary embodiment, a system for sensing paper on a paper roll, includes an ultrasonic transducer positioned to be in contact with an outer surface of the paper roll; a transmitter circuit in communication with the ultrasonic transducer, the transmitter circuit providing a transmit signal to the ultrasonic transducer, the ultrasonic transducer generating an ultrasonic signal in response to the transmit signal, the ultrasonic signal for transmission into the paper roll; a receiver circuit in communication with the ultrasonic transducer, the receiver circuit providing a received signal indicative of an ultrasonic return echo from the paper roll, the ultrasonic return echo resulting from the ultrasonic signal interacting with the paper roll; and a processor circuit in communication with the transmitter circuit and the receiver circuit, the processor circuit determining an amount of paper remaining on the paper roll in response to the transmit signal and the receive signal, the processor providing an output signal when the amount of paper remaining falls below a threshold; wherein the processor determines the length of paper remaining on the paper roll is determined by:

$$L=(D_o^2-D_i^2)\pi/4T,$$

where,

L is a length of paper remaining on the paper roll, $D_o$ is an outer diameter of the paper roll, $D_i$ is an inner diameter of the paper roll, wherein the inner diameter of the paper roll 10 is equivalent to an outside diameter of the carrier, and T is the thickness of one layer of the paper on the paper roll.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
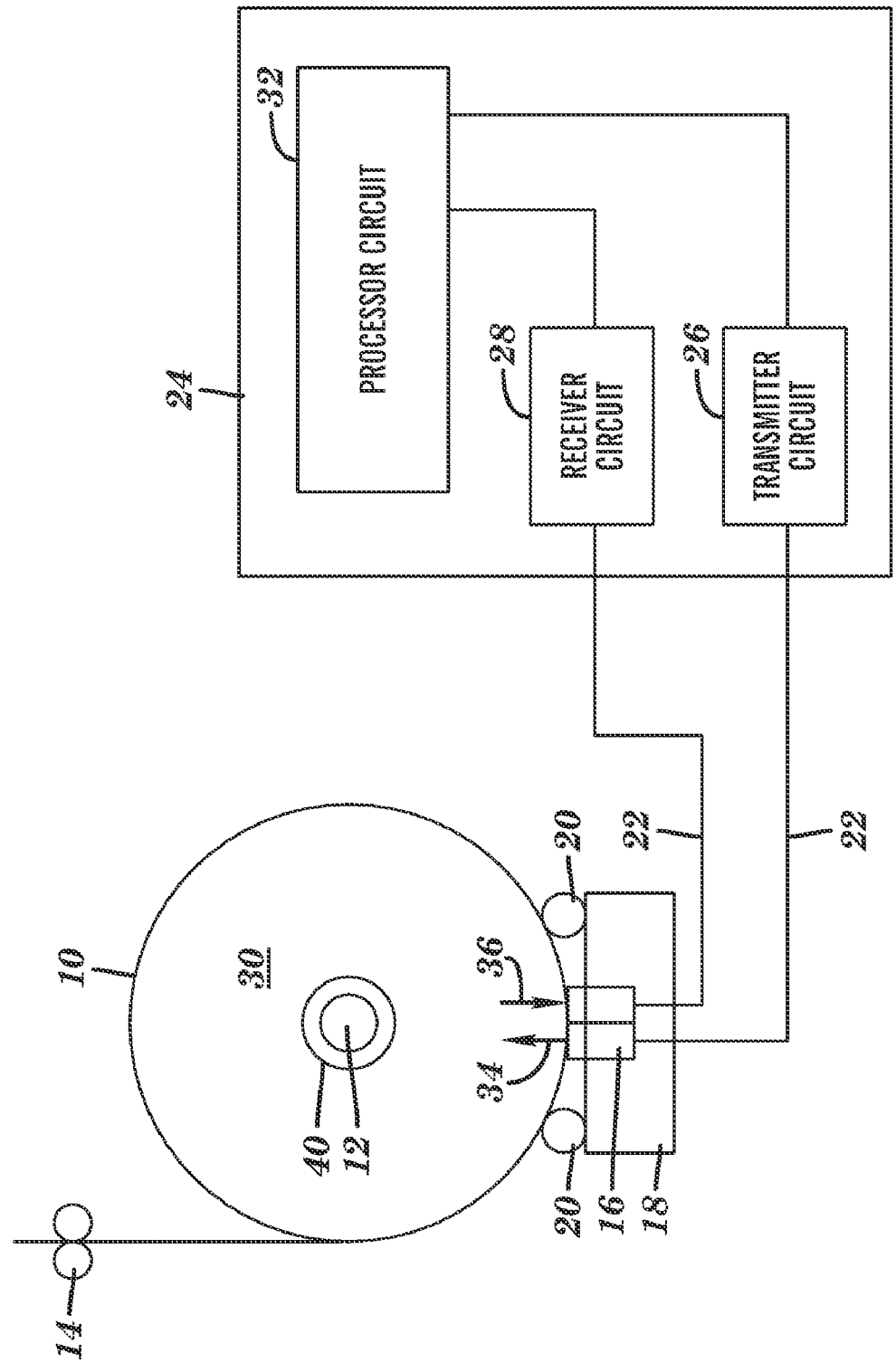
FIG. 1 diagrammatically illustrates one example of a system for sensing a paper roll ultrasonically.

Turning now to the drawings in greater detail, it will be seen that in FIG. 1 there is a paper roll 10 such as is commonly found in point-of-sale devices for use in printing receipts, which includes a continuous sheet of paper 30 rolled onto a hollow carrier 40. The hollow carrier 40 is typically composed of a cardboard or plastic material. Paper roll 10, and, more particularly, the carrier 40, is typically disposed on a spindle 12 of a point of sale device (not shown), as is well known. A feeder 14 of the point of sale device dispenses paper receipts, also as is well known. An ultrasonic transducer 16 is positioned, by a biased holder 18, to be in contact with the outer surface of the paper roll 10. The biased holder 18 is simply a holder receptive to supporting the ultrasonic transducer 16 that is mounted within the point of sale device with a force applied to maintain contact of the ultrasonic transducer 16 with the outer surface of the paper roll 10. The biased holder 18 further includes a pair of rollers 20 that permit the paper roll 10 to easily rotate relative to the ultrasonic transducer 16 while maintaining the aforementioned contact with the paper roll 10. The ultrasonic transducer 16 can be a piezoelectric ceramic ultrasonic transducer.

The ultrasonic transducer 16 is electrically connected by lines 22 to an electronic circuit assembly 24, which is disposed within the point of sale device. A transmitter circuit 26 provides a transmit signal to the transducer 16 for generating an ultrasonic signal 34 to be transmitted into the paper roll 10. A receiver circuit 28 measures a detected return echo 36 from the transducer 16, of the ultrasonic signal. A microprocessor 32 is provided to process the measured return echo to determine an estimated amount of paper remaining on the paper roll 10. Once it is determined that the paper is about to run out, an output signal is generated to indicate that the paper roll needs to be replaced. The amount of paper remaining when the signal to replace the paper roll is generated can be set at the processor 32. This output signal may simply activate a visual display (such a lamp, not shown), drive an audible alarm (not shown), generate a systems management alert to another computer, or generate a prompt at a screen, for detection by a staff person.

In the present example, the ultrasonic signal generated by the transducer 16 is a 100 nanosecond (nsec.) pulse. The pulse travels through the paper roll 10 resulting in a return echo. The return echo over time reveals the amount of paper (P) between the outer surface (outer diameter=$D_o$) and the inner carrier (inner diameter=$D_i$) of the paper roll 10, by multiplying the speed of sound (i.e., 1432 mm./ms. (millimeters per millisecond)) by the edge feature times. Edge feature times or Echos (E) are the times, in milliseconds, between particular edges of the reflected ultrasonic waveform. Thus:

$$P=(D_o-D_i)/2=(E mm.)(1432 mm/ms)$$

The unit of P is mm.

Figure 2:
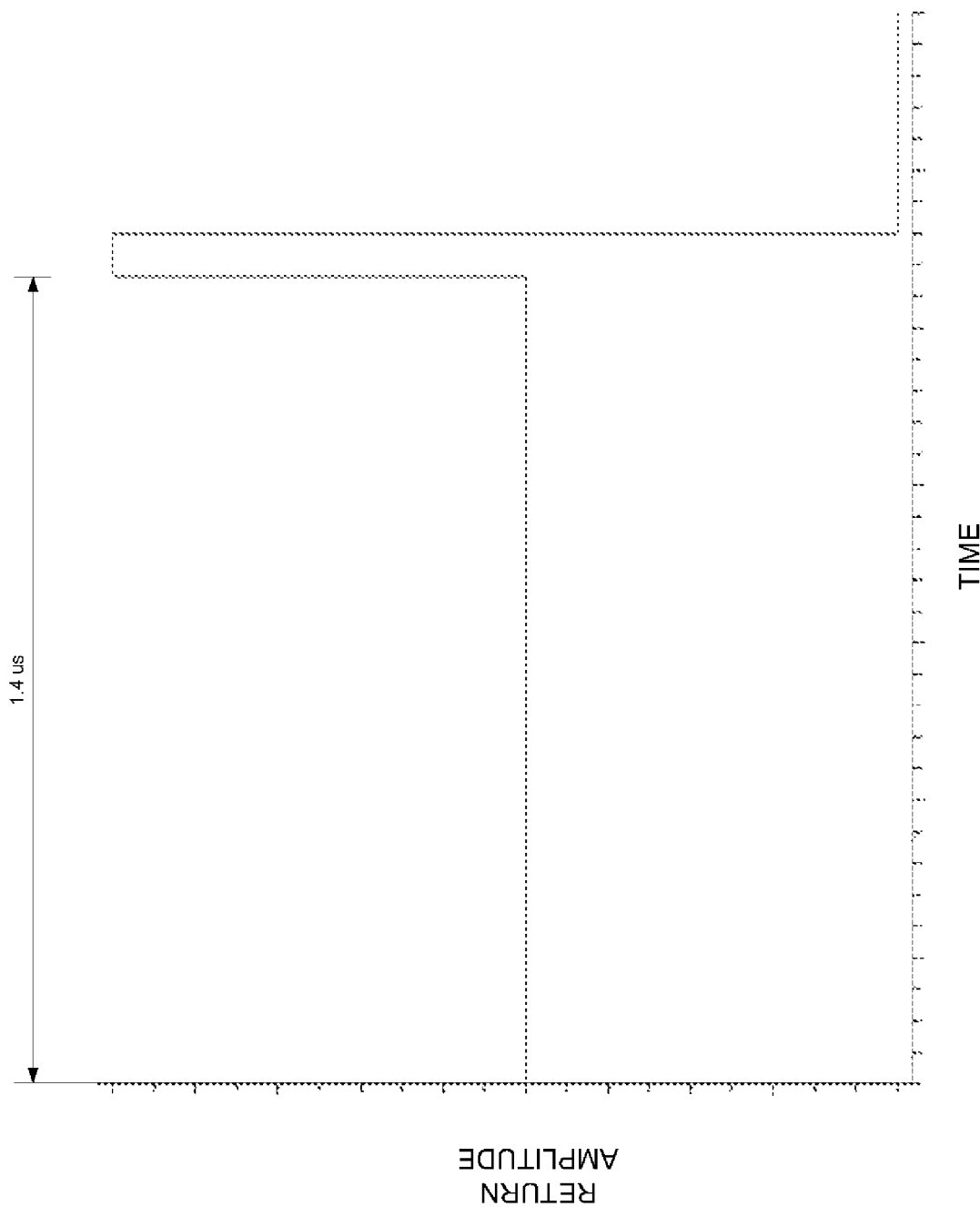
FIG. 2 illustrates one example of a return echo signal plotted as a function of amplitude and time.

Turning now to FIG. 2, a plot of a detected return echo from the paper roll 10 is shown for the 100 nsec. pulse ultrasonic signal. The first portion of the plot, i.e., from 0 to 0.0014 ms. (=1.4 us), reveals an amount of paper at one side on the paper roll (P (between an outer surface of the paper roll 10 (outer diameter=$D_o$) and an outside surface of the carrier 40 (inner diameter=$D_i$)) to be 2.0 mm. (0.0014 ms. multiplied by 1432 mm./ms). Further, knowing the outside diameter of the carrier 40, which is in this example 22 mm, results in an outside diameter of the paper roll 10 of 26 mm.

$$P=(D_o-D_i)/2 \rightarrow D_o=2P+D_i$$

A description of a method of determining the thickness of the paper on the roll follows. After determining a first paper roll diameter (as described above) and printing several receipts that total 1.5 meters (i.e., the length of paper fed in a printer is easily determined), a second ultrasonic pulse detects an echo after 0.0007 ms. Now the amount of paper on one side of the paper roll 10 is 1.0 mm. (i.e., 0.0007 ms. multiplied by 1432 mm./ms.) and the second outside diameter of the paper roll 10 is 24 mm. (i.e., 22 mm., the outside diameter of the carrier 40 plus 2 times 1 mm. amount of paper). The thickness of one layer of the paper can be calculated by dividing the cross sectional area of the roll between the first outer diameter ($D_o$=26 mm.) and the second inner diameter ($D_i$=24 mm.) by the length of paper printed (L=1.5 meters) resulting in a paper thickness of 0.05 mm. Thus the equation for thickness (T) is:

$$T=(\pi(D_o/2)^2-\pi(D_i/2)^2)/L=(D_o^2-D_i^2)\pi/4)\pi/L$$

An example of an actual calculation of T would be (((26 squared minus 24 squared)/4) multiplied by 3.1416 divided by 1500 mm.).

In determining when to signal for replacement of the paper roll 10, one exemplary approach would signal that the paper supply is low when the desired remaining paper length is specified. To provide this signal, the desired outside diameter of the paper roll 10 is calculated by rearranging the equation for paper thickness to solve for $D_o$=the first outer diameter:

$$\text{From above: } T=(D_o^2-D_i^2)/4)\pi/L \rightarrow TL/\pi=(D_o^2-D_i^2)/4)$$
$$\rightarrow 4TL/\pi=D_o^2-D_i^2 \rightarrow 4TL/\pi+D_i^2=D_o^2 \rightarrow D_o=(4TL/\pi*D_i^2)^{1/2}$$

Thus the preceding calculation of $D_o$ takes the square root of the sum of 4 times the thickness of the paper times the specified length divided by 3.1416 and the outer diameter of the carrier 40 squared. Here the thickness of the paper can be determined by the method described previously or it may be known.

The calculated outside diameter of the paper roll 10 less the known inside diameter of the paper roll 10 (i.e., the outside diameter of the carrier 40) divided by 2 yields the amount of paper that should be on one side of the paper roll 10 to signal that paper should be replaced. In other words, this is the minimum amount of paper (P) that the ultrasonic must pass through without low paper being indicated.

$$P=(D_o-D_i)/2$$

The corresponding echo time (E) is now calculated by dividing this distance (P) by 1432 mm./ms.: E=(P mm.)/1432 mm./ms. The unit of E is ms.

For example: if the signal for replacement of the paper is desired to occur when there are 5 meters of paper left on a carrier having a 22 mm. outer diameter and using the paper thickness calculated previously of 0.05 mm, the desired outside diameter of the paper roll 10 is 28.3 mm. (i.e., square root of (4 times 0.05 mm. times 5000 mm. divided by 3.1416 plus 22 mm. squared)). The desired amount of paper on the paper roll 10 is 3.15 mm. (i.e., 28.3 minus 22 divided by 2) and the desired echo time is 0.0022 ms. (i.e., 3.15 mm. divided by 1432 mm./ms.).

Once the outer diameter ($D_o$), the inner diameter ($D_i$) and paper thickness are known, the length of paper remaining on the paper roll (L) can be easily determined by rearranging the equation for paper thickness to solve for L:

$$\text{From above: } T=(D_o^2-D_i^2)/4)\pi/L \rightarrow TL=(D_o^2-D_i^2)/4)$$
$$\pi \rightarrow L=(D_o^2-D_i^2)\pi/4T$$

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

There may be many variations to the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for sensing paper on a paper roll, comprising:
   an ultrasonic transducer positioned to be in contact with an outer surface of the paper roll;
   a transmitter circuit in communication with the ultrasonic transducer, the transmitter circuit providing a transmit signal to the ultrasonic transducer, the ultrasonic transducer generating an ultrasonic signal in response to the transmit signal, the ultrasonic signal for transmission into the paper roll;
   a receiver circuit in communication with the ultrasonic transducer, the receiver circuit providing a received signal indicative of an ultrasonic return echo from the paper roll, the ultrasonic return echo resulting from the ultrasonic signal interacting with the paper roll; and
   a processor circuit in communication with the transmitter circuit and the receiver circuit, the processor circuit determining an amount of paper remaining on the paper roll in response to the transmit signal and the receive signal, the processor providing an output signal when the amount of paper remaining falls below a threshold;
   wherein the processor determines the length of paper remaining on the paper roll is determined by:

$$L=(D_o^2-D_i^2)\pi/4T,$$

where,
L is a length of paper remaining on the paper roll,
$D_o$ is an outer diameter of the paper roll,
$D_i$ is an inner diameter of the paper roll, wherein the inner diameter of the paper roll 10 is equivalent to an outside diameter of the carrier, and
T is the thickness of one layer of the paper on the paper roll.

2. The system of claim 1, further comprising an indicator for indicating, in response to the output signal, that the paper roll needs to be replaced.

3. The system of claim 1, further comprising a holder receptive to the ultrasonic transducer for biasing the ultrasonic transducer to be in contact with the outer surface of the paper roll.

4. The system of claim 1, wherein the ultrasonic signal has about a 100 nanosecond pulse width.

5. The system of claim 1, wherein the processor determines the amount of paper remaining on the paper roll by multiplying the speed of sound by an edge feature time.

6. The system of claim 1, wherein the ultrasonic transducer comprises a piezoelectric ceramic ultrasonic transducer.

* * * * *